(12) United States Patent
Kalyanasundaram et al.

(10) Patent No.: US 11,838,876 B2
(45) Date of Patent: Dec. 5, 2023

(54) POWER SPECTRAL DENSITY AWARE UPLINK SCHEDULING

(71) Applicant: NOKIA SOLUTIONS AND NETWORKS OY, Espoo (FI)

(72) Inventors: Suresh Kalyanasundaram, Bangalore (IN); Saikat Saha, Bangalore (IN); Shalini Gulati, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/108,285

(22) Filed: Feb. 10, 2023

(65) Prior Publication Data

US 2023/0262613 A1 Aug. 17, 2023

(30) Foreign Application Priority Data

Feb. 15, 2022 (FI) ...................................... 20225135

(51) Int. Cl.
*H04W 52/36* (2009.01)
*H04L 1/00* (2006.01)
*H04L 47/62* (2022.01)

(52) U.S. Cl.
CPC ......... *H04W 52/365* (2013.01); *H04L 1/0003* (2013.01); *H04L 1/0009* (2013.01); *H04L 47/6225* (2013.01)

(58) Field of Classification Search
CPC ............. H04W 36/36; H04W 36/0055; H04W 36/0079; H04W 72/1268; H04W 8/22; H04W 36/0044; H04L 27/2614

(Continued)

(56) References Cited

U.S. PATENT DOCUMENTS 9,973,257 B1 * 5/2018 Sung .................. H04B 7/15528
10,153,831 B1 12/2018 Gokhale et al.
(Continued)

FOREIGN PATENT DOCUMENTS

CN 103974399 A * 8/2014 ............. H04B 7/005
CN 102647796 B * 5/2015 .......... H04W 52/367
(Continued)

OTHER PUBLICATIONS

Communication of Acceptance—section 29 a of Patents Decree dated Jun. 16, 2022 corresponding to Finnish Patent Application No. 20225135.
(Continued)

*Primary Examiner* — David Q Nguyen
(74) *Attorney, Agent, or Firm* — SQUIRE PATTON BOGGS (US) LLP

(57) ABSTRACT

According to an aspect, there is provided an apparatus for performing the following. The apparatus is configured to, first, allocate one or more of a plurality of available physical resource blocks to a plurality of terminal devices, wherein the allocating is performed so that a power spectral density for the plurality of terminal devices matches or exceeds a pre-defined limit or a plurality of respective pre-defined limits for power spectral density. In response to one or more physical resource blocks being still available following said allocating, the apparatus is configured to further allocate at least one of the one or more physical resource blocks still available to at least one of the plurality of terminal devices, wherein the further allocating is performed so that at least a pre-defined value for a modulation and coding scheme index is sustainable for said at least one of the plurality of terminal devices.

17 Claims, 8 Drawing Sheets

(58) Field of Classification Search
USPC .................. 370/328, 329, 330, 331, 311
See application file for complete search history.

(56) References Cited

U.S. PATENT DOCUMENTS

| | | | | |
|---|---|---|---|---|
| 2012/0327866 | A1* | 12/2012 | Krishnamurthy | H04W 52/10 370/329 |
| 2018/0331964 | A1 | 11/2018 | Pocovi et al. | |
| 2021/0022051 | A1* | 1/2021 | Jia | H04L 27/2614 |

FOREIGN PATENT DOCUMENTS

| | | | | |
|---|---|---|---|---|
| CN | 108882383 | B | | 9/2020 |
| CN | 113891447 | A * | | 1/2022 |
| CN | 106664703 | B * | 7/2022 | ............ H04L 41/08 |
| WO | 2012/062126 | A1 | | 5/2012 |

OTHER PUBLICATIONS

Finnish Search Report dated Jun. 16, 2022 corresponding to Finnish Patent Application No. 20225135.

Intel Corporation, "Enhancements to NR UL signals and channels for unlicensed operation," R1-1808684, 3GPP TSG RAN WG1 Meeting #94, Gothenburg, Sweden, Aug. 20-24, 2018.

Extended European Search Report dated Jun. 30, 2023 corresponding to European Patent Application No. 23156447.7.

Fernando H. S. Pereira et al., "Energy-Efficient Fragmentation-Avoidance Uplink Packet Scheduler for SC-FDMA-Based Systems," 2018 IEEE Symposium on Computers and Communications (ISCC), IEEE, Jun. 25, 2018, pp. 819-824, XP0333448555.

Woon Kim et al., "Power headroom report-based uplink power control in 3GPP LTE-A HetNet," EURASIP Journal on Wireless Communications and Networking, vol. 2015, No. 1, Oct. 26, 2015, XP055978958.

* cited by examiner

POWER SPECTRAL DENSITY AWARE UPLINK SCHEDULING

CROSS REFERENCE TO RELATED APPLICATION

This application claims the benefit of Finnish Patent Application No. 20225135, filed Feb. 15, 2022. The entire content of the above-referenced application is hereby incorporated by reference.

TECHNICAL FIELD

Various example embodiments relate to wireless communications.

BACKGROUND

Efficient use of air interface bandwidth enables operators to serve more users (i.e., more terminal devices) with the available radio frequency (RF) spectrum. In the uplink direction, a terminal device is able to provide only limited transmit power (e.g., approximately 23 dBm or 200 mW). This may restrict the maximum number of PRBs which may be allocated to a given user. Further, this restriction on maximum transmit power of the terminal device coupled with the limit on maximum number of users that can be scheduled in a given slot or mini-slot may lead to some PRBs being left unused in scheduling which, in turn, results in underutilization of the available RF spectrum.

Thus, there is a need for a solution enabling more efficient utilization of the full bandwidth available.

BRIEF DESCRIPTION

According to an aspect, there is provided the subject matter of the independent claims. Embodiments are defined in the dependent claims. The scope of protection sought for various embodiments is set out by the independent claims.

The embodiments and features, if any, described in this specification that do not fall under the scope of the independent claims may be interpreted as examples useful for understanding various embodiments.

BRIEF DESCRIPTION OF THE DRAWINGS

In the following, some example embodiments will be described with reference to the accompanying drawings, in which.

DETAILED DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
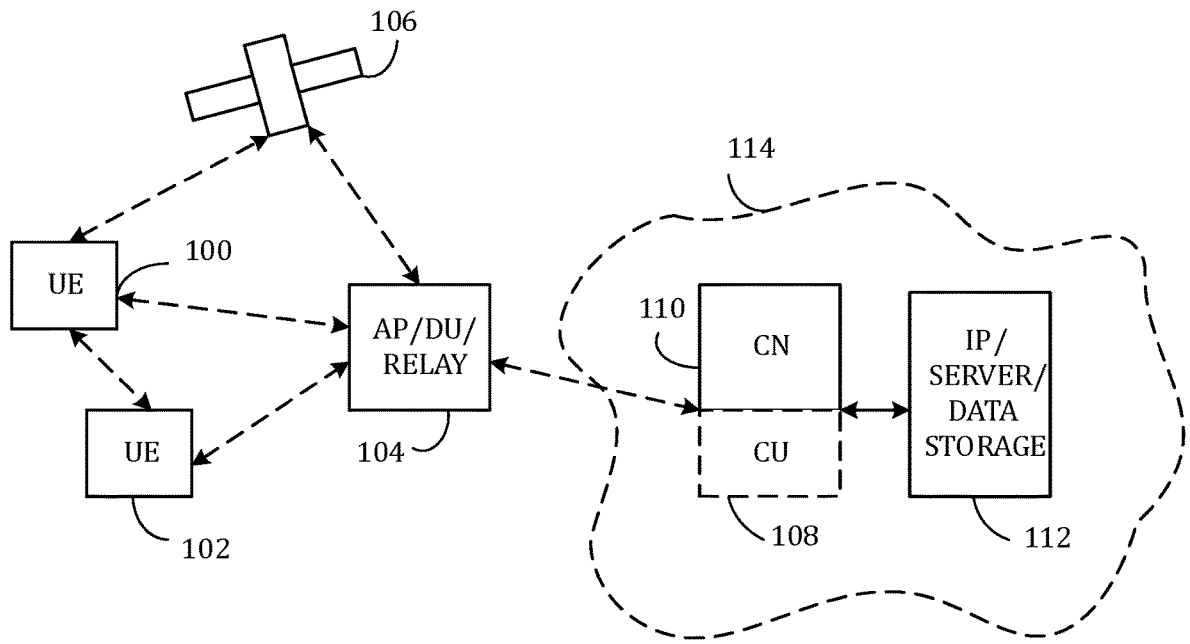
FIG. 1 illustrates an example of a communications system to which embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 (equally called terminal devices) configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal or terminal device) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

5G may also utilize unlicensed spectrum, similar to WLAN or Multefire. 5G operating in unlicensed spectrum is also referred to as NR-U.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)NodeBs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Efficient use of air interface bandwidth enables operators to serve more users (i.e., more terminal devices) with the available RF spectrum and/or to produce further throughput. A good scheduling algorithm and efficient PRB allocation scheme can improve spectral efficiency by scheduling users at an opportune time and with better utilization of the available PRBs. In the uplink direction, a terminal device is able to provide only limited transmit power (e.g., approximately 23 dBm or 200 mW, depending on several factors such as terminal device capability and power reduction). This may restrict the maximum number of PRBs which may be allocated to a given user. The number of allocated PRBs for a given terminal device may depend on several different factors, such as, the location of the terminal device within the cell, the power control parameters used by the terminal device, the modulation and coding scheme (MCS) allocated for the terminal device. Further, this restriction on maximum transmit power of the terminal device coupled with the limit on maximum number of users that can be scheduled in a given slot or mini-slot may lead to some PRBs being left unused in scheduling which, in turn, results in underutilization of the available RF spectrum. In addition to enabling utilization of the full bandwidth, a resource assignment method can also ensure an improved allocation of bandwidth among the scheduled terminal devices such that a better spectral efficiency and throughput can be achieved or more data can be carried on the same amount of air interface resource.

Certain current PRB allocation algorithms attempt to equally distribute PRBs among eligible terminal devices with similar quality of service (QoS) requirements and buffered data. However, due to the uplink transmit power limitation of terminal devices, an eligible terminal device on the uplink may be assigned a lower number of PRBs than its fair share for being able to sustain the MCS index of 0 (or other lowest allowed MCS index value) is achievable. Thus, if in a scheduling opportunity, all eligible terminal devices may be provided an equal share of N available PRBs, and if one of those eligible terminal devices is a power-limited terminal device which is able to utilize only M (<N) of the available N PRBs, N-M PRBs could potentially be further distributed among the other scheduled terminal devices. In fact, assigning power-limited terminal devices many PRBs at the cost of a reduction in MCS may even hurt system performance in more ways than one. On one hand, by assigning terminal devices in poor RF conditions a larger number of PRBs results in assignment of lower MCS and lower bps/Hz for these terminal devices. On the other hand, resources are taken away from terminal devices in good RF conditions that would be able to use a higher MCS and better spectral efficiency or bits per second per hertz value.

Therefore, if terminal devices in poor RF conditions are assigned PRBs such that their power spectral density (PSD) is not lowered, and the extra available PRBs are assigned to terminal devices under better RF conditions, a higher spectral efficiency may be achieved. In addition, to improve the performance of power-limited and/or cell-edge terminal devices, these terminal devices may be scheduled more frequently in the time domain, at least under load conditions where the terminal device in question is not already being scheduled in every slot. The embodiments to be discussed below in detail provide an uplink PRB allocation scheme for implementing said concept(s) and thus overcoming or at least alleviating the problems mentioned above.

Figure 2:
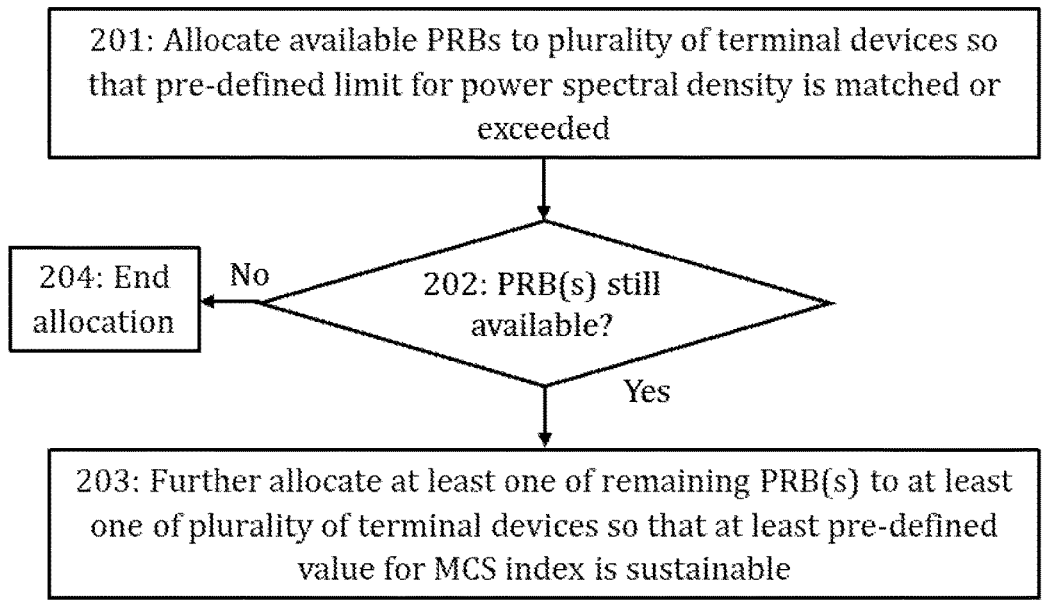
FIGS. 2 to 4 illustrate examples of processes according to embodiments.

FIG. 2 illustrates a process according to embodiments. The illustrated process may be carried out by an access node such as an access node 104 of FIG. 1 or a particular part (e.g., a computing device for scheduling or other apparatus) comprised in said access node. In some embodiments, the illustrated process may be carried out by a distributed unit of an access node (e.g., DU 104 of FIG. 1) or a centralized unit of an access node. In the following, the entity carrying out the process is called simply an apparatus without loss of generality.

Initially, it may be assumed that the apparatus is aware of a plurality of terminal devices for which uplink PRB allocation should be performed. The plurality of terminal device may correspond to terminal devices short-listed for current transmission time interval (TTI) scheduling. In some embodiments, the apparatus or another apparatus communicatively connected to said apparatus may have already performed time-domain scheduling for the plurality of terminal devices.

The apparatus allocates, in block 201, one or more of a plurality of available PRBs to the plurality of terminal devices. The allocating in block 201 is performed so that a pre-defined limit (or threshold) for power spectral density is matched (i.e., equaled) or exceeded for the plurality of terminal devices (i.e., the pre-defined limit for the power spectral density is not compromised). In other words, the allocation for a given terminal device is limited to a largest number of PRBs which still corresponds to a value of the power spectral density (i.e., power-per-PRB) calculated for the terminal device which is equal to or above the pre-defined limit. The allocation of block 201 is called, in the following, the first round of PRB allocation.

In some embodiments, a plurality of pre-defined limits for the power spectral density may be defined, respectively, for the plurality of terminal devices, instead of a single pre-defined limit for all of the plurality of terminal devices, in block 201. At least some of said plurality of pre-defined limits may be different from each other. Thus, in summary, the allocating in block 201 is performed so that a power spectral density for the plurality of terminal devices matches or exceeds a pre-defined limit or a plurality of respective pre-defined limits for power spectral density (i.e., so that a pre-defined limit or a plurality of respective pre-defined limits for power spectral density are not compromised).

In some embodiments, the pre-defined limit or the plurality of pre-defined limits (respectively) for power spectral density may correspond to power spectral density associated with a previous or current allocation for the plurality of terminal devices. Thus, the allocation in block 201 may be carried out so that it does not lead to worsening of the performance in terms of power spectral density for any of the plurality of terminal devices.

In some embodiments, the apparatus may calculate, in block 201, for each (or at least one) of the plurality of terminal devices, a maximum number of PRBs transmittable by a terminal device without the power spectral density falling below the pre-defined limit (of said terminal device) for the power spectral density according to one or more transmission parameters of the terminal device. The allocating in block 201 may, then, be performed based on said maximum numbers of PRBs transmittable by the plurality of terminal devices. Namely, the apparatus may prioritize, in the allocating in block 201, terminal devices with a low maximum number of PRBs transmittable by a terminal device over terminal devices with a high number of maximum number of PRBs transmittable by a terminal device.

To enable the allocation in block 201, the apparatus may initially calculate values of the power spectral density (i.e., power-per-PRB) for the plurality of terminal devices based on the transmission parameters of the plurality of terminal devices. One or more transmission parameters for a given terminal device may comprise at least a target received power at an access node (assuming full pathloss compensation) $P_0$ for the terminal device, a fractional power control factor $\alpha$ for the terminal device and current pathloss PL for a radio channel between the terminal device and the access node. The fractional power control factor $\alpha$ may have a value between 0 and 1, where $\alpha=0$ indicates that there is no pathloss compensation (i.e., all terminal devices transmit at the same power leading typically to different received powers due to differing pathlosses of different radio channels) and $\alpha=1$ indicates full pathloss compensation for achieving same received power for all terminal devices. The pre-defined limit for power spectral density (or transmission power per PRB) may also be comprised in said one or more transmission parameters.

Using the aforementioned three parameters $P_0$, $\alpha$ and PL, the transmit power of a terminal device per PRB $P_{RPB}$ (using absolute values, not dB) may be written as $$P_{PRB} = \min(P_{PowerClass}, P_0 * PL^{\alpha}), \quad (1)$$

where $P_{PowerClass}$ is a maximum output power per PRB for a (pre-defined) power class of the terminal device (i.e., a maximum transmit power of the terminal device for a PRB). The power class may be specifically 5G NR power class.

The transmit power of the terminal device per PRB $P_{TX}$ may correspond to the aforementioned power spectral density while the maximum output power per PRB for the power class of the terminal device $P_{PowerClass}$ may correspond to the pre-defined limit (of said terminal device) for the power spectral density.

To perform the allocation in block 201, the apparatus may further calculate, for each (or at least one) of the plurality of terminal devices, the maximum number of PRBs "$nPRB_{MCS}$" transmittable by the terminal device without the power spectral density falling below the pre-defined limit (of said terminal device) for the power spectral density according to $$nPRB_{MCS} = \mathrm{floor}\left(\frac{P_{UL}}{P_{PRB}}\right) = \mathrm{floor}\left(\frac{P_{UL}}{\min(P_{PowerClass}, P_0 * PL^{\alpha})}\right), \quad (2)$$

where $P_{UL}$ is an uplink transmit power of the terminal device and $P_{PRB}$ is the transmit power of the terminal device per PRB.

In some embodiments, following the completion of the first round of PRB allocation in block 201, the apparatus may store the transport block size (TB S), information on the allocated PRBs and/or MCS for the plurality of terminal devices (or at least the ones for which PRBs were allocated) to terminal device context maintained in a memory of the apparatus.

The apparatus determines, in block 202, whether any PRBs are still available for allocation following the first round of allocation in block 201. In response to one or more PRBs being still available in block 202, the apparatus further allocates, in block 203, at least one of the one or more PRBs still available to at least one of the plurality of terminal devices. The further allocating in block 203 is performed so that a pre-defined value (or one of a plurality of pre-defined values) for the MCS index is sustainable for said at least one (or all) of the plurality of terminal devices. In an embodiment, the pre-defined value for the MCS index is 0. The value of the MCS index defines, according to a general definition, an achievable value for the number of spatial streams, the modulation type and achievable value for the coding rate. For example, for MCS index of 0, the number of spatial streams is 1, the modulation type is binary phase shift keying (BPSK), and the coding rate is ½. The allocation in block 203 is called, in the following, the second round of allocation.

In response to no PRBs being available in block 202, the PRB allocation process ends in block 204.

In some embodiments, the further allocating (i.e., the second round of allocation) in block 203 comprises allocating all of the one or more PRBs still available following the initial allocating in block 201.

In some embodiments, the apparatus may calculate, in block 203, for each (or at least one) of said at least one of the plurality of terminal devices, a maximum number of PRBs for sustaining the pre-defined value of the MCS index while maximizing throughput. The maximum number of PRBs for sustaining the pre-defined value of the MCS index for a given terminal device may be calculated by, first, calculating power spectral density (i.e., power per PRB) for the terminal device at a given pathloss and, second, calculating the maximum number of PRBs for sustaining the pre-defined value of the MCS index based on the power spectral density and the parameter(s) associated with the pre-defined value of the MCS index (i.e., by determining the largest number of PRBs for which the power spectral density is still equal to or larger than the power spectral density needed for the pre-defined value of the MCS index). The further allocating in block 203 may, then, be performed based on said maximum numbers of PRBs for sustaining the pre-defined value of the MCS index (e.g., MCS index of 0) calculated for the plurality of terminal devices.

In some embodiments, the apparatus may prioritize, in the further allocating in block 203, terminal devices with a high value of a second pre-defined scheduling metric (e.g., a proportional fair scheduling metric) over terminal devices with a low value of the second pre-defined scheduling metric. The second pre-defined scheduling metric may be defined here as discussed below in connection with block 408 of FIG. 4.

In some embodiments, following the completion of the second round of PRB allocation in block 203, the apparatus may store or update the transport block size (TBS), information on the allocated PRBs and/or MCS for the plurality of terminal devices (or at least the ones for which PRBs were allocated in block 203) to terminal device context maintained in a memory of the apparatus.

In response to no PRBs being still available in block 202, the apparatus may simply terminate the allocation process.

In some embodiments, the allocation of PRBs in the first round in block 201 and/or in the second round in block 203 may be carried out using a round-robin scheduling algorithm or a weighted round-robin scheduling algorithm. In round-robin scheduling for PRB allocation, PRBs are assigned to each terminal device in equal portions and in circular order, handling all terminal devices without priority. In weighted round-robin scheduling for PRB allocation, PRBs are assigned to each terminal device in weighted (i.e., at least partially unequal) portions and in circular order, handling all terminal devices without priority. In other embodiments, another scheduling algorithm (e.g., deficit round-robin scheduling algorithm, a weighted fair queuing scheduling algorithm, a proportional fairness scheduling algorithm or a delay-aware scheduling algorithm) may be employed. The scheduling algorithms used in the first and second rounds 201, 203 may be the same (or same type of) algorithms or different (or different type of) algorithms.

By carrying out the uplink PRB allocation in two rounds defined in connection with blocks 201, 203, any cell center terminal devices (having typically a high-quality RF channel) will be allocated an increased number of PRBs compared to reference algorithm which attempts to equally distribute PRBs among terminal devices with similar QoS and data buffers. Additionally, cell edge terminal devices (having typically a low-quality RF channel) will be allocated with a smaller number of PRBs such that higher MCS index can be applied for said cell edge terminal devices. Thus, higher spectral efficiency and consequently higher system throughput can be achieved. Also, the cell edge terminal devices may be scheduled more often in the time domain so that the reduction of the number of PRBs in a grant can be compensated for. The uplink PRB allocation scheme according to embodiments will produce very good results especially for higher uplink system bandwidths, e.g., 5G uplink system bandwidths (e.g., 100 MHz).

One possible use case for the embodiments involves a system comprising one or more power limited terminal devices and one or more non-power limited terminal devices. In such a system, the one or more power limited terminal devices may be restricted into fewer PRBs compared to the non-power limited terminal devices (i.e., the pre-defined limit for power spectral density may be defined differently for the power limited and non-power limited terminal devices). Further, the one or more power limited terminal devices may be configured with a higher pre-define value for the MCS index compared to the one or more non-power limited terminal devices. This will help to achieve higher spectral efficiency. Moreover, the one or more power limited terminal devices can be scheduled more frequently in the time domain such that they get their fair share over a given period.

Figure 3:
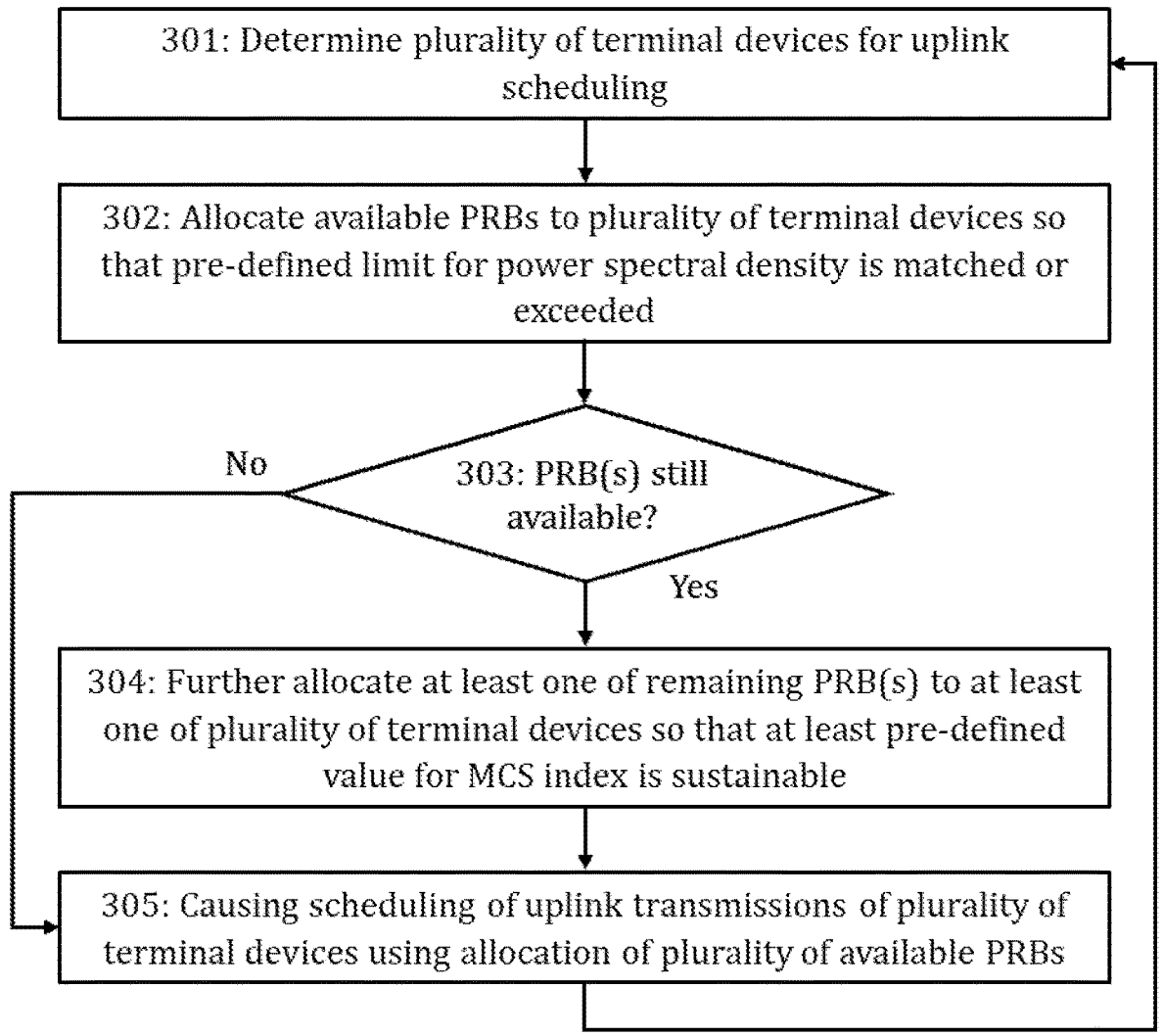

FIG. 3 illustrates another process according to embodiments. The illustrated process may be carried out by an access node such as an access node 104 of FIG. 1 or a particular part (e.g., a computing device for scheduling or other apparatus) comprised in said access node. In some embodiments, the illustrated process may be carried out by a distributed unit of an access node (e.g., DU 104 of FIG. 1) or a centralized unit of an access node. The process of FIG. 3 may correspond to a more detailed implementation of the process of FIG. 2. In the following, the entity carrying out the process is called simply an apparatus without loss of generality.

Initially, the apparatus determines, in block 301, a plurality of terminal devices for uplink PRB allocation. The determining in block 301 may comprise selecting, from M eligible terminal devices, N terminal devices having the N highest values of a first pre-defined scheduling metric as the plurality of terminal devices for uplink PRB allocation. Here, M and N are integers larger than one (or larger than zero) with M N, and a high value of the first pre-defined scheduling metric for a terminal device indicates the terminal device is to be prioritized for scheduling. The first pre-defined scheduling metric (or equally the first pre-defined prioritization metric) may be, for example, a proportional fair scheduling metric or a QoS metric.

In some embodiments, the first pre-defined scheduling metric for a given terminal device may be defined as a metric dependent on (or defined based on) one or more of the following parameters: signal-to-interference-plus-noise ratio (SINR) measured at an access node serving the terminal device, QoS requirement of the terminal device and a subscription of the terminal device in the network. In some embodiments, the first pre-defined scheduling metric may be defined to be one of the listed parameters.

The parameter N may be defined to be equal to the maximum number of terminal devices schedulable in uplink (in a cell served by an access node) while satisfying a physical downlink control channel (PDCCH) limit and/or one or more pre-defined hardware constraints (e.g., a pre-defined processing limit). The PDCCH limit is a limit which restricts the number of terminal devices schedulable per scheduling opportunity. For example, in 100 MHz deployment with 2 symbols PDCCH configuration, there can be a maximum of 22 terminal devices scheduled in a scheduling opportunity if aggregation level 4 is used. Regarding the pre-defined hardware constraints (or specifically the pre-defined processing limit), it may be assumed that the access node software is running on a given hardware specification so that M machine instructions can be executed per second (M being a positive integer). When the number of terminal devices scheduled per TTI increases, the number of machine instructions required to be executed by the access node is also increased. Thus, the pre-defined processing limit also limits the number of terminal device schedulable per TTI. To give an example, with aforementioned capacity, 30 terminal devices may be scheduled per TTI. In other words, the number of terminal device schedulable per scheduling opportunity with the given hardware capacity is 30. It should be noted that the actual capacity of a terminal device may be defined as a minimum of the PDCCH and hardware capacities (i.e., a minimum of 22 and 30 in the above example).

Above, it was assumed that the N highest values of a first pre-defined scheduling metric indicate that the associated N terminal devices are optimal for scheduling. In other embodiments, the first pre-defined scheduling metric may be defined in an inverse manner so that low values indicate preference for scheduling or high scheduling prioritization. In such cases, N terminal devices having the N lowest values of the first pre-defined scheduling metric may be selected in block 301.

In some embodiments, the apparatus may also perform time-domain scheduling in block 301 or before it.

Then, the apparatus may perform, in blocks 302 to 304, the allocation of the available PRBs (or at least some of them) to the plurality of terminal devices (i.e., N terminal devices) in a similar manner as described in connection with blocks 201 to 203 of FIG. 2.

Finally, in response to the allocation coming to an end either in block 303 (No) or block 304, the apparatus causes, in block 305, scheduling of uplink transmissions of the plurality of terminal device using the determined allocation of the plurality of available PRBs. For example, the apparatus may at least cause, in block 305, transmitting information on the allocated PRBs to the plurality of terminal devices (or to a part thereof if no allocation is made for all of the plurality of terminal devices). The information may be transmitted, e.g., as downlink control information (DCI).

Figure 4:
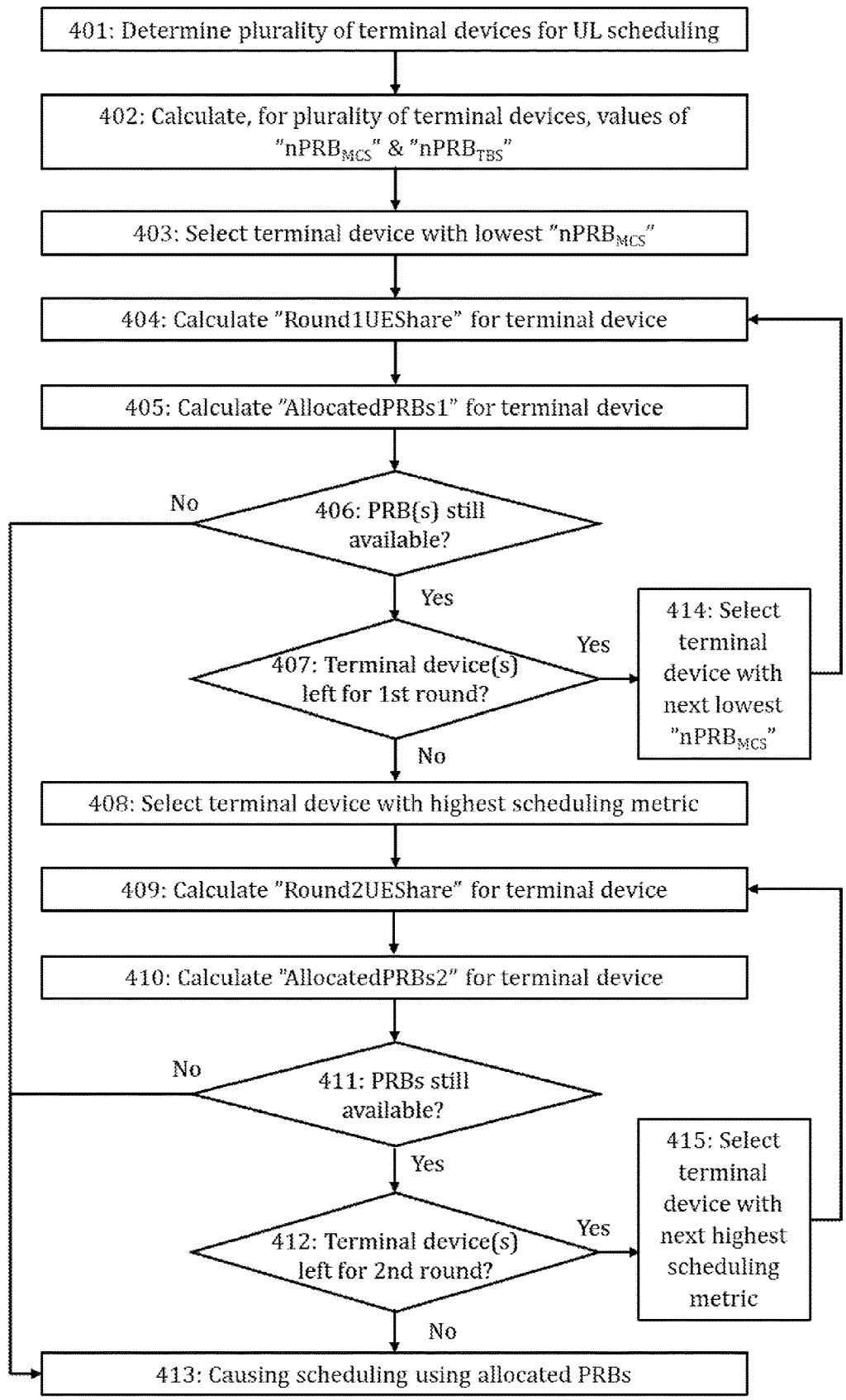

FIG. 4 illustrates yet another process according to embodiments. The illustrated process may be carried out by an access node such as an access node 104 of FIG. 1 or a particular part (e.g., a computing device for scheduling or other apparatus) comprised in said access node. In some embodiments, the illustrated process may be carried out by a distributed unit of an access node (e.g., DU 104 of FIG. 1) or a centralized unit of an access node. The process of FIG. 3 may correspond to a more detailed implementation of the process of FIG. 2 and/or FIG. 3. FIG. 4 correspond to an example of round-robin type scheduling carried out in consecutive first and second rounds of PRB allocation. In the following, the entity carrying out the process is called simply an apparatus without loss of generality.

Referring to FIG. 4, the apparatus initially determines (or selects), in block 401, a plurality of terminal device for uplink PRB allocation. Block 401 may correspond fully to block 301 of FIG. 3. The plurality of terminal devices may correspond to terminal devices short-listed for current transmission time interval (TTI) scheduling.

Then, the apparatus calculates, in block 402, for each (or at least one) of the plurality of terminal devices, a maximum number of physical resource blocks "nPRB$_{MCS}$" transmittable by a terminal device according to one or more transmission parameters of the terminal device without compromising a pre-defined limit (of said terminal device) for power spectral density (i.e., the power per PRB limit P$_{PowerClass}$). Said one or more transmission parameters for a given terminal device may comprise at least a target received power at an access node (assuming full pathloss compensation) P$_0$ for the terminal device, a fractional power control factor α for the terminal device and current pathloss PL for a radio channel between the terminal device and the access node (and optionally also the maximum output power for a power class of the terminal device P$_{PowerClass}$), as discussed also above. This calculation may be performed, e.g., using (1) & (2).

Further, the apparatus calculates, in block 402, for each (or at least one) of said at least one of the plurality of terminal devices, a maximum number of physical resource blocks "nPRB$_{TBS}$" for sustaining a pre-defined value (e.g., 0) for the MCS index while maximizing throughput.

As described above, the allocation of the PRBs may be carried out in two consecutive rounds of allocation. In FIG. 4, the first round of PRB allocation involves blocks 403 to 406, 414 while the second round of PRB allocation involves blocks 407 to 412, 415.

In the first round of PRB allocation, the apparatus initially selects, in block 403, a terminal device of the plurality of terminal devices corresponding to the lowest value of "nPRB$_{MCS}$" (out of the plurality of values of "nPRB$_{MCS}$" calculated for the plurality of terminal devices). For example, the apparatus may, in block 403, sort the plurality of terminal device in an ascending order based on values of "nPRB$_{MCS}$" and select the first (i.e., initial) terminal device of said sorted set comprising the plurality of terminal devices. Obviously, the plurality of terminal devices may be equally sorted in a descending order based on values of "nPRB$_{MCS}$" and the last terminal device in said sorted set may be selected first. In other embodiments, the terminal device may be sorted in another order (based on other metric).

The apparatus calculates, in block 404, an initial maximum number of PRBs to be allocated to the (selected) terminal device "Round1UEShare" as $$Round1UEShare = \max\left(1, \text{floor}\left(\frac{w_{UE,i}}{\sum_{j=i}^{N} w_{UE,j}} * RemainingPRBs\right)\right), \quad (3)$$

where "RemainingPRBs" is the number of currently remaining PRBs to be allocated and $w_{UE,i}$ is a weight or weighing factor for the ith terminal device (i.e., the selected terminal device) of the plurality of terminal devices arranged in said order of ascending "nPRB$_{MCS}$", j is a summing index and N is the number of the plurality of terminal devices. For the initial terminal device, the index i has a value of 1. The index i in $w_{UE,i}$ corresponds to the aforementioned sorted order of the plurality of terminal devices in the first round of PRB allocation, that is, the ith terminal device corresponds to a terminal device having the ith lowest value of "nPRB$_{MCS}$". The weighing factor $w_{UE,i}$ for a given terminal device may depend, e.g., on a QoS metric and one or more wireless channel metrics. "RemainingPRBs1" is associated specifically with the first round of PRB allocation. At this point in the process (i.e., when performing the allocation for the first terminal device), "RemainingPRBs" corresponds to all of the available PRBs for uplink allocation.

In (3), the general case where the plurality of terminal devices were assigned a corresponding plurality of weighing factors was considered. In some embodiments, these weighing factors may be defined to one for all of the plurality of terminal devices. In such embodiments, the equation (3) may be written in a simplified form as $$Round1UEShare = \max\left(1, \text{floor}\left(\frac{RemainingPRBs}{RemainingUEs1}\right)\right), \quad (4)$$

where "RemainingUEs1" is the number of currently remaining terminal devices of the plurality of terminal devices awaiting (first round) allocation (including here also the selected terminal device). At this point in the process (i.e., when performing the allocation for the first terminal device), "RemainingUEs1" corresponds to all of the plurality of terminal devices determined for uplink PRB allocation in block 401.

The apparatus allocates, in block 405, to the terminal device, an initial number of PRBs being equal to $$AllocatedPRBs1 = \min(Round1UEShare1, nPRB_{MCS}), \quad (5)$$

wherein "$nPRB_{MCS}$" is the maximum number of PRBs transmittable by the terminal device (without compromising the power per PRB). "Round1UEShare" in (5) is provided by (3) or (4).

The apparatus determines, in block 406, whether all of the PRBs which were initially available for allocation have already been allocated.

If it is determined that all the PRBs have been allocated in block 406, the apparatus causes, in block 413, scheduling of uplink transmissions of the plurality of terminal devices using the allocation of the plurality of available PRBs determined in blocks 401 to 406, 414. The causing scheduling in block 413 may be carried out similar to as described in connection with block 305 of FIG. 3.

If it is determined that all the PRBs have been not allocated in block 406, the apparatus determines, in block 407, whether or not all of the plurality of terminal devices have gone through the first round of allocation (i.e., whether at least one PRB has been allocated for each of the plurality of terminal devices). If this is not the case, the apparatus selects, in block 414, the next terminal device of the plurality of terminal devices having the next lowest "nPRBMCS" (i.e., the lowest "nPRBMCS" of the one or more terminal devices for which the first round of PRB allocation has not been carried out). Using the notation of (3), the apparatus increments, in block 414, the index i by one. Then, the process described above in connection with blocks 405 to 406 is repeated for said next terminal device.

This process of first round PRB allocations repeats in the order of ascending "nPRBMCS" values until it is determined, in block 406, that all of the available PRBs have been allocated or it is determined, in block 407, that one or more PRBs have been allocated to each of the plurality of terminal devices. The values of parameters "RemainingPRBs" and "RemainingUEs1" are updated regularly during said process as PRBs are allocated for terminal devices (e.g., in block 414). The updating may be carried out, for example, according to the equations:

$$RemainingPRBs = RemainingPRBs - AllocatedPRBs \quad (6)$$

$$RemainingUEs1 = RemainingUEs1 - 1. \quad (7)$$

As described also in connection with FIG. 2, following the completion of the first round of PRB allocation, the apparatus may store the transport block size (TBS), information on the allocated PRBs and/or MCS for the plurality of terminal devices (or at least the ones for which PRBs were allocated in the first round) to terminal device context maintained in a memory of the apparatus.

If it is determined, in block 407, that all of the plurality of terminal devices have gone through the first round of PRB allocation, the apparatus proceeds to the second round of PRB allocation. In the second round of PRB allocation, the apparatus initially selects, in block 408, a terminal device of the plurality of terminal devices corresponding to the highest value of a pre-defined second scheduling metric. Here, it is assumed that a high value of the pre-defined second scheduling metric indicates that associated terminal device should be prioritized in scheduling. The second pre-defined scheduling metric may be, for example, a proportional fair scheduling metric or a QoS metric. The second pre-defined scheduling metric may be the same or different compared to the first pre-defined scheduling metric.

In some embodiments, the second pre-defined scheduling metric for a given terminal device may be defined as a metric dependent on (or defined based on) one or more of the following parameters: signal-to-interference-plus-noise ratio (SINR) measured at an access node serving the terminal device, QoS requirement of the terminal device and a subscription of the terminal device in the network. In some embodiments, the second pre-defined scheduling metric may be defined to be one of the listed parameters.

The selecting in block 408 may involve determining or calculating values of the pre-defined second scheduling metric for the plurality of terminal devices, sorting the plurality of terminal devices in a descending (or ascending) order based on the values of the pre-defined second scheduling metric and selecting said initial terminal device of round 2 allocation to be the first (or last) terminal device of said sorted set comprising the plurality of terminal devices.

The apparatus calculates, in block 409, a second maximum number of PRBs "Round2UEShare" to be allocated to the terminal device having the lowest value of a second pre-defined scheduling metric as $$Round2UEShare = \max\left(1, \text{floor}\left(\frac{w'_{UE,i}}{\sum_{j=i}^{N} w'_{UE,j}} * RemainingPRBs\right)\right), \quad (8)$$

where "RemainingPRBs" is the number of currently remaining PRBs to be allocated and $w'_{UE,i}$ is a weight or weighing factor for the ith terminal device of the plurality of terminal devices (i.e., the selected terminal device) arranged in said order of descending values of the second pre-defined scheduling metric, j is a summing index and N is the number of the plurality of terminal devices. For the initial terminal device, the index i has a value of 1. The index i in $w'_{UE,i}$ corresponds to the aforementioned sorted order of the plurality of terminal devices in the second round of PRB allocation, that is, the ith terminal device corresponds to a terminal device having the ith highest value of the second pre-defined scheduling metric. The weighing factor $w'_{UE,i}$ for a given terminal device may depend, e.g., on a QoS metric and one or more wireless channel metrics. "RemainingPRBs1" is associated specifically with the first round of PRB allocation. The weighing factors $w'_{UE,i}$ used in the second round of PRB allocation may, as a whole, correspond to the weighing factors $w_{UE,i}$ used in the first round of PRB allocation though their order may be different (ordered here based on the second pre-defined metric as opposed to based on "$nPRB_{MCS}$"). In other words, each terminal device may be associated with the same weighing factor during both of the first and second rounds but with different i indices. In other embodiments, different weighing factor values may be used in the first and second rounds.

In (8), the general case where the plurality of terminal devices were assigned a corresponding plurality of weighing factors was considered. In some embodiments, these weighing factors may be defined to be one for all of the plurality of terminal devices. In such embodiments, the equation (8) may be written in a simplified form as $$Round2UEShare = \max\left(1, \text{floor}\left(\frac{RemainingPRBs}{RemainingUEs2}\right)\right), \quad (9)$$

where "RemainingUEs2" is the number of currently remaining terminal devices of the plurality of terminal devices awaiting further allocation (i.e., PRB allocation in the second round). Initially, "RemainingUEs2" has a value equal to the number of the plurality of terminal devices.

The apparatus allocates, in block 410, to the terminal device having the lowest value of the second pre-defined scheduling metric, a number of additional PRBs "AllocatedPRBs2" being equal to $$AllocatedPRBs2=\min(Round2UEShare, nPRB_{TBS}-nPRB_{MCS}), \quad (10)$$

where "$nPRB_{TBS}$" is the maximum number of physical resource blocks for sustaining a pre-defined value of the MCS index (e.g., MCS index of 0) as calculated in block 402 and "$nPRB_{MCS}$" is the maximum number of physical resource blocks transmittable by the terminal device, as defined also above. Here, "Round2UEShare" may be calculated based on (8) or (9).

The apparatus determines, in block 411, whether all of the PRBs which were initially available for allocation have already been allocated (either in the first or second round of allocation). In other words, the apparatus determines, in block 411, whether one or more available PRBs are yet to be allocated.

If it is determined that all the PRBs have been allocated in block 411, the apparatus causes, in block 413, scheduling of uplink transmissions of the plurality of terminal devices using the allocation of the plurality of available PRBs determined in blocks 401 to 406, 414, 415. The causing scheduling in block 413 may be carried out similar to as described in connection with block 305 of FIG. 3.

In response to the number of currently remaining PRBs (i.e., available PRBs waiting allocation) following the allocating of "AllocatedPRBs2" PRBs being larger than zero in block 411, the apparatus selects, in block 415, a terminal device having the next highest value of the second pre-defined scheduling metric. Subsequently, the process described in connection with blocks 409 to 411 and possibly block 412 is repeated for that next terminal device. This process of second round of PRB allocation repeats until it is determined, in block 411, that all of the available PRBs have been allocated or it is determined, in block 412, that one or more PRBs have been allocated to each of the plurality of terminal devices in the second round of PRB allocation. Similar to as described for the first round, the values of parameters "RemainingPRBs" and "RemainingUEs2" are updated regularly during execution of the second round of PRB allocation as PRBs are allocated for terminal devices (e.g., in block 415). The updating may be carried out, for example, according to the equations:

$$RemainingPRBs=RemainingPRBs-AllocatedPRBs \quad (11)$$

$$RemainingUEs2=RemainingUEs2-1. \quad (12)$$

As described in connection with FIG. 2, following the completion of the second round of RPB allocation, the apparatus may store or update the transport block size (TBS), information on the allocated PRBs and/or MCS for the plurality of terminal devices (or at least the ones for which PRBs were allocated in the second round) to terminal device context maintained in a memory of the apparatus.

If it is determined that all of the plurality of terminal device have gone through the second round of PRB allocation in block 412 (i.e., no next terminal device is selectable in block 415), the apparatus causes, in block 413, scheduling of uplink transmissions of the plurality of terminal devices using the allocation of the plurality of available PRBs determined in blocks 401 to 412, 414, 415. The causing scheduling in block 413 may be carried out similar to as described in connection with block 305 of FIG. 3.

In embodiments discussed above, it was assumed all of the plurality of terminal devices to which uplink PRB was carried out have full buffer traffic. In other words, the buffers of the data flows of the terminal devices were always assumed to have unlimited amount of data to transmit and, therefore, transmission of the data payloads effectively never finishes. However, the case of finite buffer traffic may be easily handled, by the solutions according to embodiments, by limiting the (total) PRB allocation (i.e., the total number of PRBs allocated) for a given terminal device to be smaller than or equal to the number of PRBs that will fully exhaust the buffer of that terminal device. This limiting may be carried out by the apparatus carrying out also the rest of the PRB allocation process according to embodiments.

The blocks, related functions, and information exchanges described above by means of FIGS. 2 to 4 are in no absolute chronological order, and some of them may be performed simultaneously or in an order differing from the given one.

The PRB allocation solution according to an embodiment has been simulated and its performance has been compared against a reference algorithm to highlight the benefits of the embodiments. The simulated algorithm according to an embodiment corresponds specifically to the process of FIG. 4. The pre-defined value of the MCS index to be at least sustained in the second round of PRB allocation is zero in this particular example. The reference algorithm is a frequency-domain scheduling algorithm which attempts to equally distribute PRBs among users (i.e., terminal devices) with similar QoS and data buffers. Thus, depending on the availability of PRBs, users (i.e., terminal devices) may be assigned, using the reference algorithm, PRBs beyond the PSD-limit up to their TBS limit (such that MCS 0 can be sustained). The simulation parameters used are given in the Table below.

| Simulator Parameters | Values |
| --- | --- |
| Scenario | Urban Micro (200 m ISD), Urban Macro (500 m ISD) |
| BS Antennas Configuration | 64 TRx (4Vx8Hx2) |
| BS Antenna Spacing, Antenna gain and Downtilt | Antenna spacing: Horizontal 0.5λ and vertical 0.5λ, 8 dBi single radiator gain and 8° antenna downtilt |
| MS Antennas Configuration | 1 Tx UE |
| Beamforming Algorithm | GoB |
| Scheduler | Reference Proportionate Fairness scheduling algorithm, 2-Step UL Scheduling Algorithm" with non-compromising PSD limit in the first step. |
| MU Pairing | No multiuser (MU) Pairing |
| Bandwidth | 10 MHz, 100 MHz |
| Sub-carrier Spacing | 15 KHz, 30 KHz |
| Simulation Duration /Traffic Model | 2 drops and 1 Second per drop {10, 20, 40} UEs per cell, Full Buffer |
| Link Adaptation | Based on outer loop link adaptation (OLLA) and power headroom (PHR) measurements |
| Mobility | 3 Kmph |
| Carrier Frequency and Channel Model | 3.5 GHz Carrier Frequency and UMi-3D, UMa-3D channel models as specified in 38.901 |
| UE Transmit power | 23 dBm |
| Receiver Algorithms | 4RX interference rejection combining (IRC) in beamspace with Practical Channel Estimation |

| Simulator Parameters | Values |
|---|---|
| Power control parameters | $P_0 = -100$ dBm, $\alpha = 1$ |
| MCS Table | 256 quadrature amplitude modulation (QAM) Table |

The results of the simulations for the proposed algorithm according to an embodiment and the reference algorithm are provided/illustrated in two Tables provided below and in FIGS. 5A, 5B, 5C, 5D and 5E.

The two Tables provided below show comparative results of the simulations carried out with the reference algorithm and the proposed algorithm according to an embodiment. As may be observed from the above Tables, the proposed algorithm according to an embodiment outperforms the reference algorithm under most scenarios. Gains of 6% to 10% in geometric mean of user throughput (Tput) along with 8% to 16% gains in average UE throughput are observed with the proposed algorithm over the reference algorithm.

|  | Reference Algorithm | | | | Proposed Algorithm | | | |
|---|---|---|---|---|---|---|---|---|
|  | Avg User Tput (Kbps) | Geo Mean Tput (Kbps) | Cell Edge Tput (Kbps) | System Tput (Mbps) | Avg User Tput (Kbps) | Geo Mean Tput (Kbps) | Cell Edge Tput (Kbps) | System Tput (Mbps) |
| 10 MHz and 5 UE per slot | 340.4 | 300 | 167.4 | 40.8 | 366.7 | 325.5 | 175.7 | 44 |
| 10 MHz and 10 UE per slot | 478.8 | 437.5 | 252 | 57.5 | 528.9 | 476.1 | 229.4 | 63.5 |
| 10 MHz and 15 UE per slot | 568.6 | 528.4 | 275.4 | 68.2 | 656 | 585 | 185.3 | 78.7 |
| 100 MHz and 5 UE per slot | 1451.1 | 1237.4 | 323.8 | 174.1 | 1586.7 | 1336.3 | 326.3 | 190.4 |
| 100 MHz and 10 UE per slot | 2627.2 | 2152.8 | 322.6 | 315.2 | 2939.1 | 2359 | 324.7 | 352.7 |
| 100 MHz and 15 UE per slot | 3486.4 | 2901.5 | 281.6 | 418.4 | 4048 | 3091.1 | 324.4 | 485.8 |

|  | Avg User Tput Gain % | Geo Mean Tput Gain % | Cell Edge Tput Gain % |
|---|---|---|---|
| 10 MHz and 5 UE per slot | 7.7 | 8.5 | 5 |
| 10 MHz and 10 UE per slot | 10.5 | 8.8 | -9 |
| 10 MHz and 15 UE per slot | 15.4 | 10.7 | -32.7 |
| 100 MHz and 5 UE per slot | 9.3 | 8 | 0.8 |
| 100 MHz and 10 UE per slot | 11.9 | 9.6 | 0.7 |
| 100 MHz and 15 UE per slot | 16.1 | 6.5 | 15.2 |

Figure 5A:
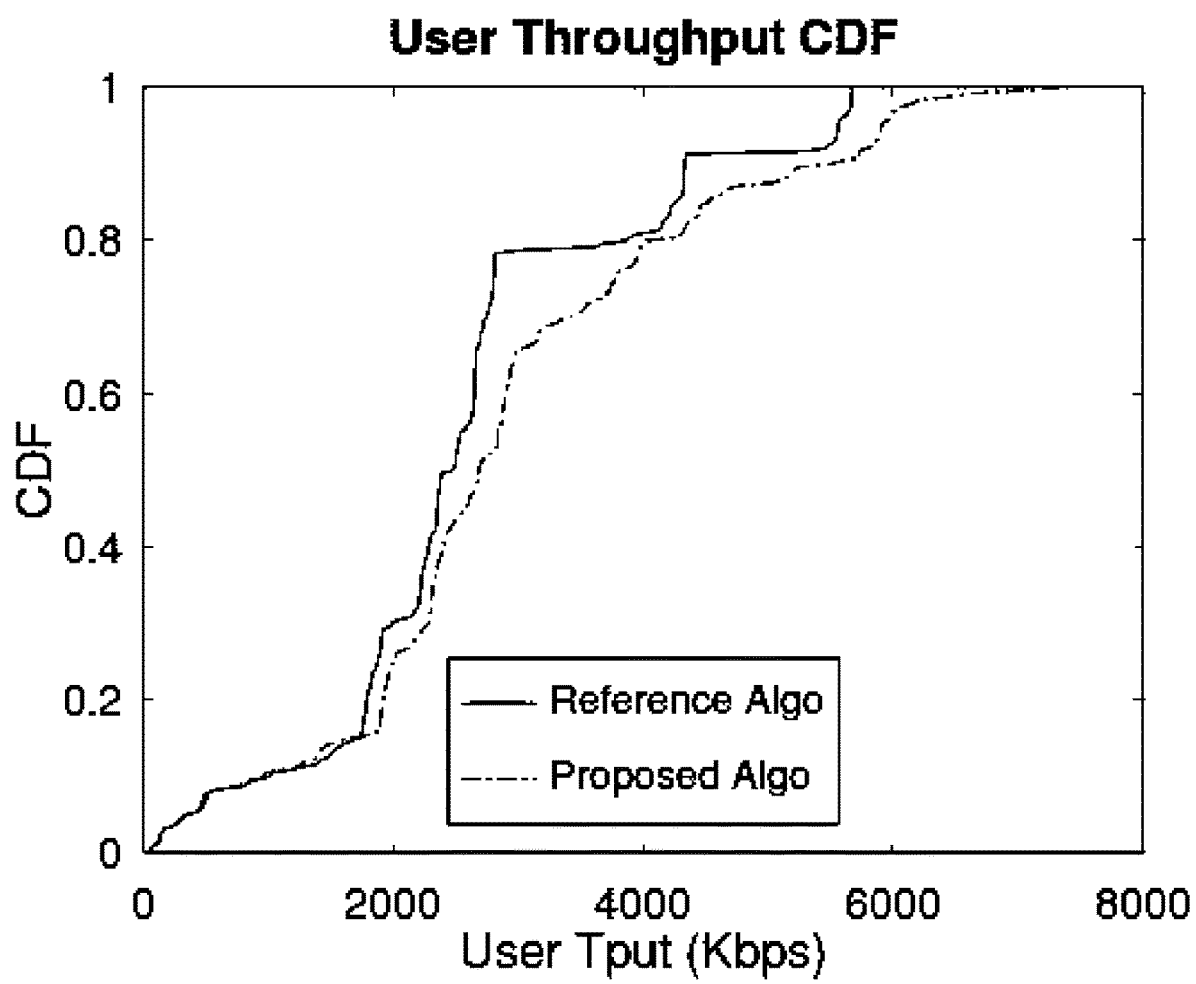
FIGS. 5A, 5B, 5C, 5D and 5E show simulation results indicative of benefits of an embodiment compared to a reference solution.
Figure 5B:
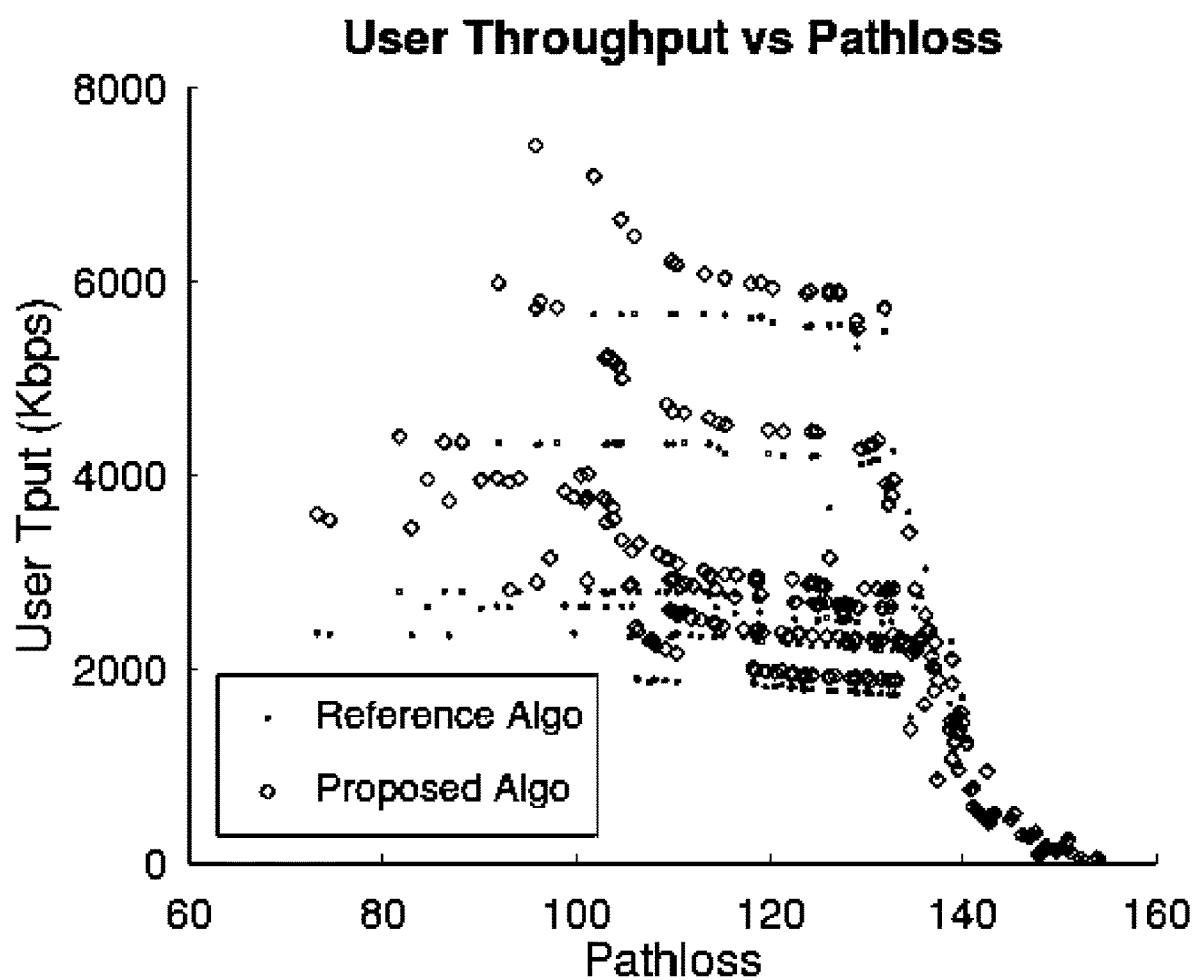

Figures 5A and 5B plot the simulated user throughput CDF and simulated user throughput vs. simulated pathloss, respectively, for the proposed algorithm and the reference algorithm. It may be observed that with the proposed algorithm most users are able to achieve better uplink throughput especially the higher throughput or cell-center users when compared to the resource allocation method of the reference algorithm.

Figure 5C:
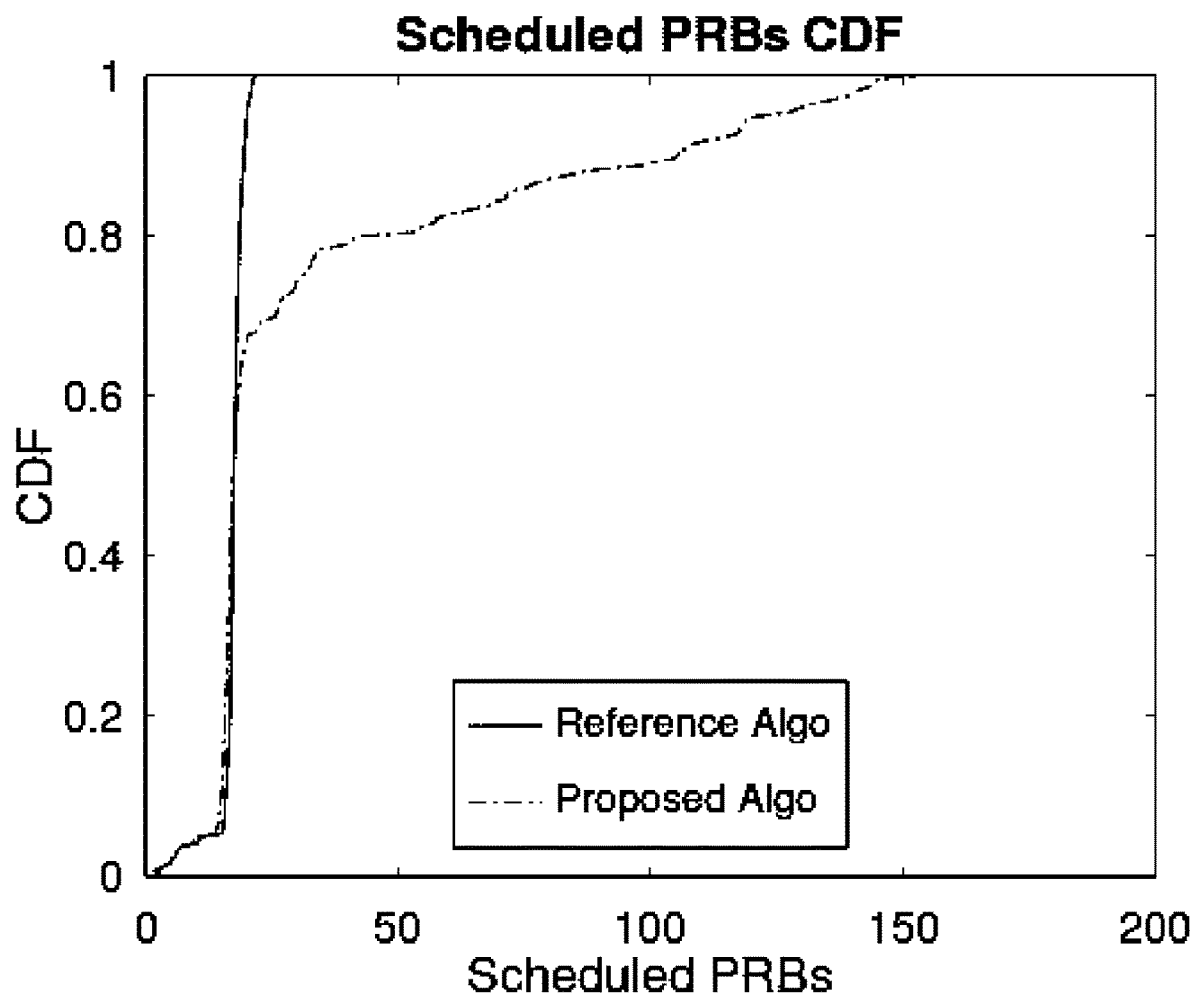

With the proposed algorithm according to an embodiment, the good RF users are allocated significantly larger number of PRBs when compared to the reference algorithm. This helps the performance of good RF users (i.e., users or terminal devices encountering good RF conditions) which, along with a large number of PRBs, may also use higher MCSs resulting in better throughput for these users. This behavior may be observed also from FIG. 5C showing simulated cumulative distribution functions (CDF) for the proposed algorithm and the reference algorithm. In contrast, the reference resource allocation algorithm attempts to equally distribute PRBs among all users resulting in lower MCSs values being assigned to users in not very good RF conditions which results in lower spectral efficiency for these users.

Figure 5D:
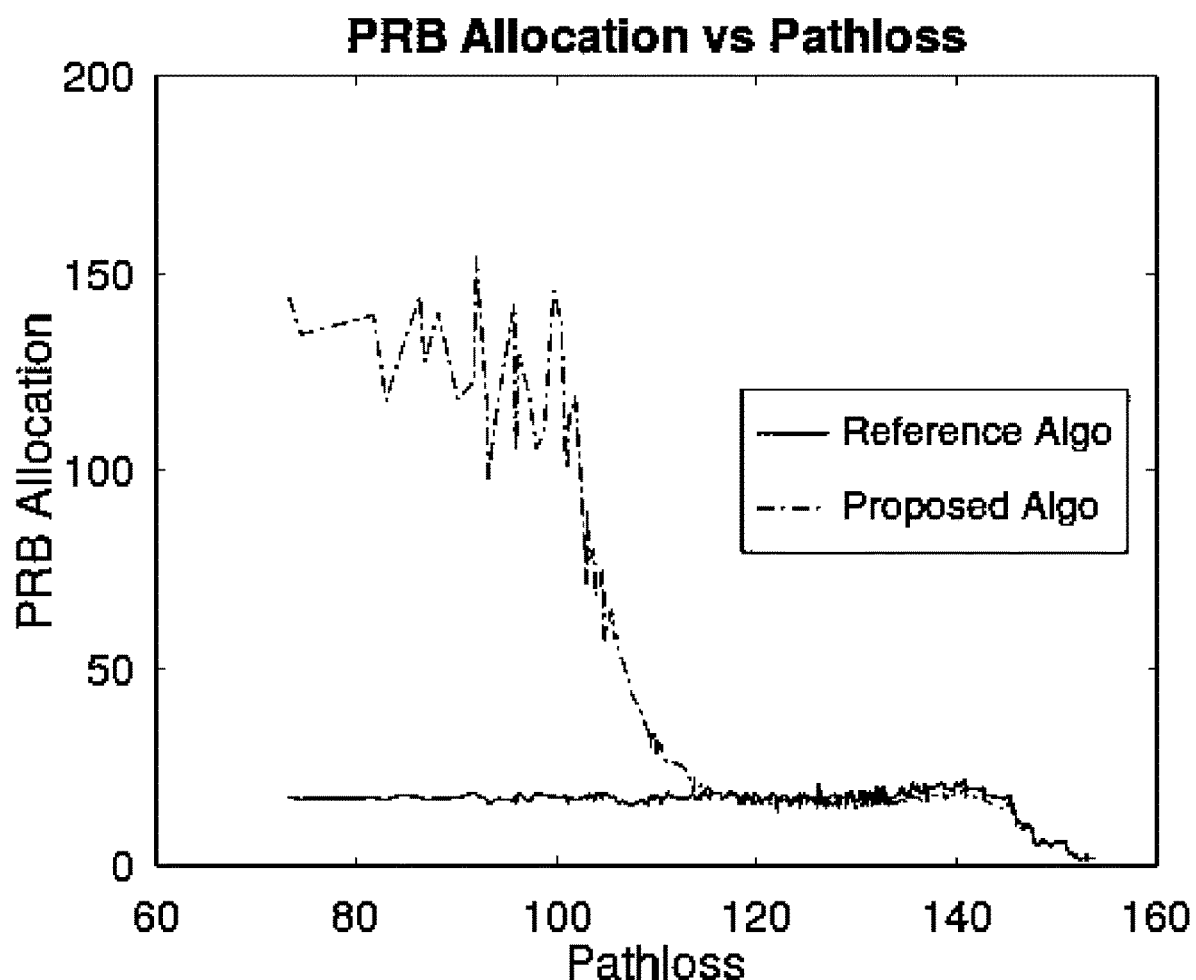

Further, from FIGS. 5C and 5D showing the simulated CDFs for allocated PRBs for a user and pathloss versus PRB allocated respectively, it may be observed that there is no significant change in the PRB allocation for cell-edge users with the proposed algorithm because of the limited power available to these users for uplink transmissions.

Figure 5E:
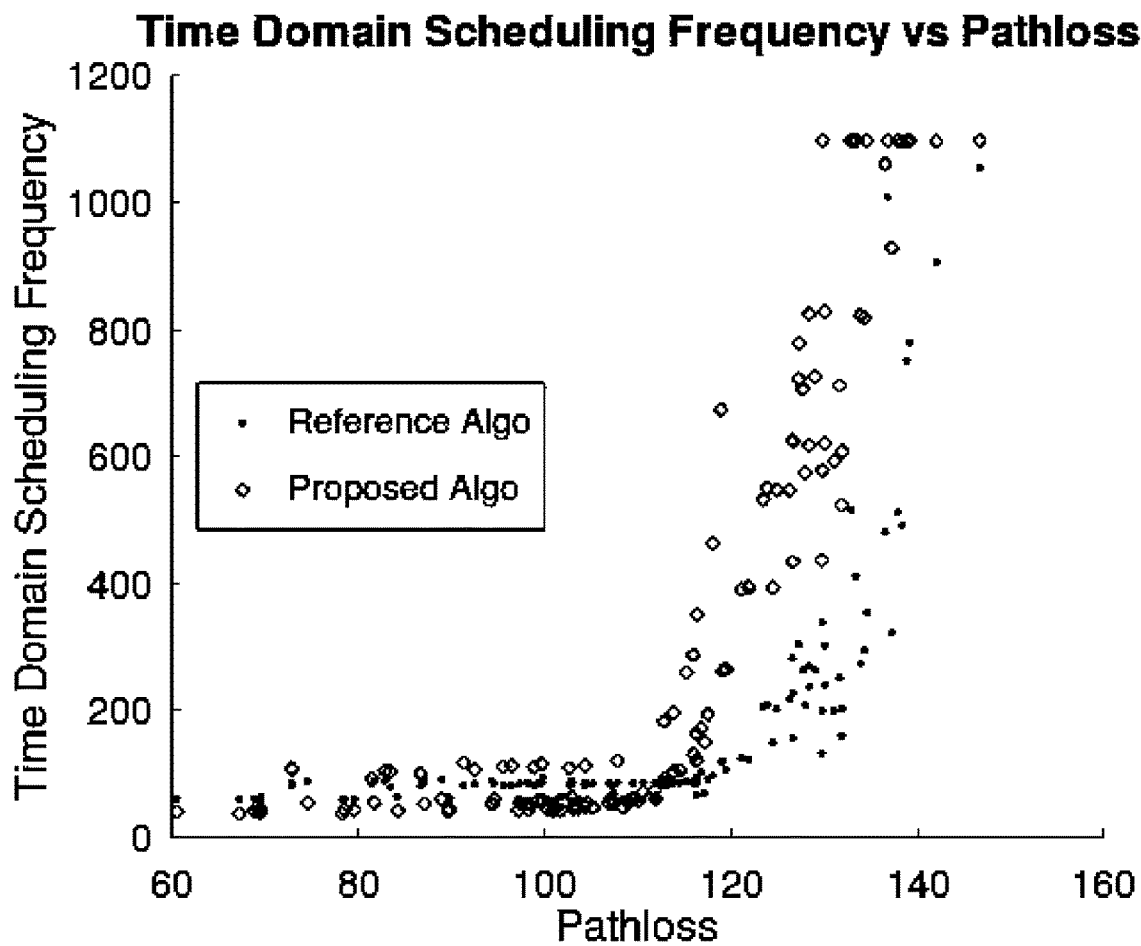

From FIG. 5E which shows the simulated number of times a user is scheduled in the time domain vs. pathloss for the proposed algorithm according to an embodiment and for the reference algorithm, it may be observed that the proposed algorithm allows mid-cell users and users that are not in good RF conditions to be scheduled more frequently in time, while users in very good RF conditions are scheduled with a lower frequency. More frequent scheduling of the no-so-good RF users helps performance as these users can use only a limited number of PRBs for a schedule because of transmit power limitation that exists for uplink. Increased scheduling frequency in time domain helps in maintaining fairness thus improving gains in user throughput. Higher scheduling frequency for these users also improves gains with increase in maximum number of scheduled UEs as can be observed from the two Tables illustrating the results of the simulations. There each cell has 40 users/cell though a maximum of 5, 10 or 15 users per cell can be scheduled in a slot.

Figure 6:
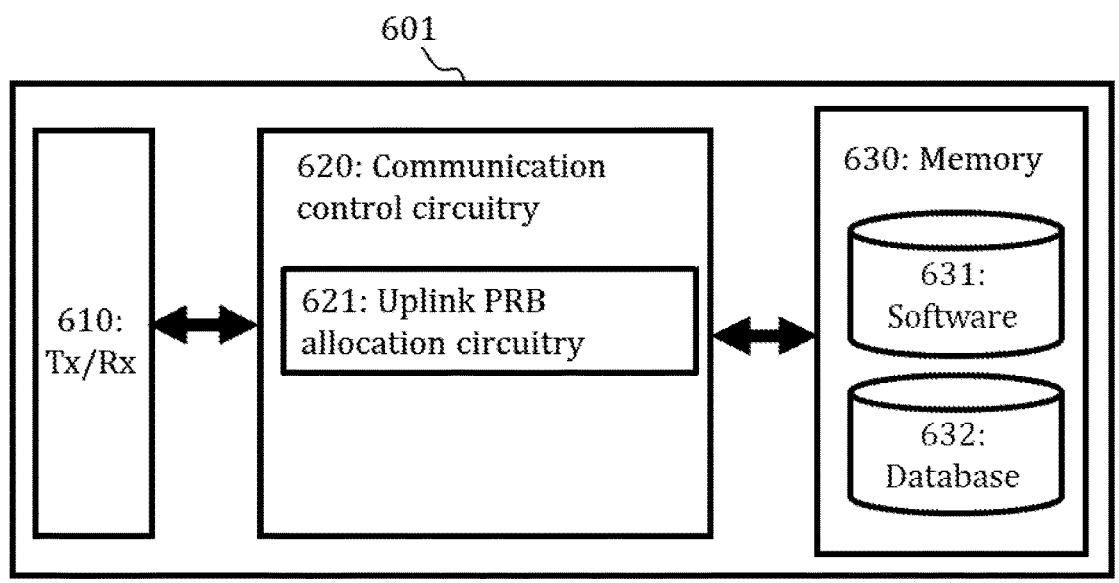
FIG. 6 illustrates an exemplary apparatus according to embodiments.

FIG. 6 illustrates an exemplary apparatus 601 configured to carry out at least some of the functions described above in connection with FIGS. 2 to 4. The apparatus 601 may be an electronic device comprising electronic circuitries. The apparatus 601 may be an access node (e.g., an access node 104 of FIG. 1) or a part thereof, a distributed unit of an access node (e.g., the distributed unit 104 of FIG. 1) or a part thereof or a central unit of an access node or a part thereof.

The apparatus 601 may comprise a communication control circuitry 620 such as at least one processor, and at least one memory 630 including a computer program code (software) 631 wherein the at least one memory 630 and the computer program code (software) 631 are configured, with the at least one processor, to cause the apparatus to carry out any one of the embodiments of the apparatus described above. Said at least one memory 630 may also comprise at least one database 632.

The memory 630 may be implemented using any suitable data storage technology, such as semiconductor based memory devices, flash memory, magnetic memory devices and systems, optical memory devices and systems, fixed memory and removable memory. The memory may comprise a learning index, as described in previous embodiments.

The apparatus 601 may further comprise one or more communication interfaces (Tx/Rx) 610 comprising hardware and/or software for realizing communication connectivity according to one or more communication protocols. The one or more communication interfaces 610 may provide the apparatus 601 with communication capabilities to communicate in the cellular communication system and enable communication with network nodes and terminal devices, for example. The one or more communication interfaces 610 may comprise standard well-known components such as an amplifier, filter, frequency-converter, (de)modulator, and encoder/decoder circuitries and one or more antennas.

Referring to FIG. 6, the communication control circuitry 620 may comprise at least uplink PRB allocation circuitry 621 configured to carry out uplink PRB allocation (namely, at least frequency-domain scheduling). The uplink PRB allocation circuitry 621 may be configured to carry out at least some of the processes illustrated in any of FIGS. 2 to 4.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 2 to 4 may be carried out by an apparatus comprising corresponding means for carrying out at least some of the described processes. Some example means for carrying out the processes may include at least one of the following: detector, processor (including dual-core and multiple-core processors), microprocessor, digital signal processor (DSP), controller, micro-controller, receiver, transmitter, encoder, decoder, memory, RAM, ROM, software, firmware, display, user interface, display circuitry, user interface circuitry, user interface software, display software, circuit, antenna, antenna circuitry, application-specific integrated circuit (ASIC), digital signal processing device (DSPD), programmable logic device (PLD) and field programmable gate array (FPGA). For firmware or software, the implementations according embodiments may be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. In an embodiment, the at least one processor, the memory, and the computer program code form processing means or comprises one or more computer program code portions for carrying out one or more operations according to any one of the embodiments of FIGS. 2 to 4 or operations thereof.

Embodiments as described may also be carried out in the form of a computer process defined by a computer program or portions thereof. Embodiments of the methods described in connection with FIGS. 2 to 4 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly, and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
   at least one processor; and
   at least one memory including computer program code, the at least one memory and the computer program code being configured, with the at least one processor, to cause apparatus to perform:
   allocating one or more of a plurality of available physical resource blocks to a plurality of terminal devices, wherein the allocating is performed so that a power spectral density for the plurality of terminal devices matches or exceeds a pre-defined limit or a plurality of respective pre-defined limits for the power spectral density; and
   in response to one or more physical resource blocks being still available following said allocating, further allocating at least one of the one or more physical resource blocks still available to at least one of the plurality of terminal devices, wherein the further allocating is performed so that a pre-defined value for a modulation and coding scheme index is sustainable for said at least one of the plurality of terminal devices.

2. The apparatus of claim 1, wherein the pre-defined value for the modulation and coding scheme index is 0.

3. The apparatus of claim 1, wherein the at least one memory and the computer program code are configured, with the at least one processor, to cause the apparatus to perform the allocating and/or the further allocating using a round-robin scheduling algorithm or a weighted round-robin scheduling algorithm.

4. The apparatus according to claim 1, wherein the further allocating comprises allocating as many of the one or more physical resource blocks still available as possible while sustaining the pre-defined value for the modulation and coding scheme index for said at least one of the plurality of terminal devices.

5. The apparatus according to claim 1, wherein the at least one memory and the computer program code are configured, with the at least one processor, to cause the apparatus to perform:
   causing scheduling of uplink transmissions of the plurality of terminal device using an allocation of the plurality of available physical resource blocks.

6. The apparatus according to claim 1, wherein the at least one memory and the computer program code are configured, with the at least one processor, to cause the apparatus to perform:
   selecting, from a plurality of eligible terminal devices, N terminal devices having the N highest values of a first pre-defined scheduling metric as the plurality of terminal devices for uplink physical resource block allocation, wherein N is an integer larger than one.

7. The apparatus of claim 6, wherein the first pre-defined scheduling metric is a metric dependent on one or more of the following parameters:
   signal-to-interference-plus-noise ratio measured at an access node serving a terminal device,
   a quality of service requirement of a terminal device and a subscription of the terminal device in a network.

8. The apparatus according to claim 5, wherein N is equal to the maximum number of terminal devices schedulable in uplink while satisfying a physical downlink control channel limit and/or one or more pre-defined hardware constraints.

9. The apparatus according to claim 1, wherein the at least one memory and the computer program code are configured, with the at least one processor, to cause the apparatus to perform:
   calculating, for at least one of the plurality of terminal devices, a maximum number of physical resource blocks transmittable by a terminal device without the power spectral density falling below an associated pre-defined limit for the power spectral density according to one or more transmission parameters of the terminal device, wherein the allocating is performed based on said at least one maximum number of physical resource blocks calculated for the at least one of the plurality of terminal devices; and
   calculating, for at least one of the plurality of terminal devices, a maximum number of physical resource blocks for sustaining the pre-defined value for the modulation and coding scheme index while maximizing throughput, wherein the further allocating is performed based on said at least one maximum number of physical resource blocks for sustaining the pre-defined value for the modulation and coding scheme index calculated for the at least one of the plurality of terminal devices.

10. The apparatus according to claim 9, wherein the at least one memory and the computer program code are configured, with the at least one processor, to cause the apparatus to perform:
    prioritizing, in said allocating, terminal devices with a low maximum number of physical resource blocks transmittable by a terminal device over terminal devices with a high number of maximum number of physical resource blocks transmittable by a terminal device; and/or
    prioritizing, in said further allocating, terminal devices with a high value of a second pre-defined scheduling metric over terminal devices with a low value of the second pre-defined scheduling metric.

11. The apparatus according to claim 9, wherein the one or more transmission parameters comprise at least a target received power at an access node assuming full pathloss compensation, a fractional power control factor and a current pathloss.

12. The apparatus according to claim 9, wherein the at least one memory and the computer program code are configured, with the at least one processor, to cause the apparatus to perform the allocating by:
    performing, for at least one of the plurality of terminal devices, in an order of ascending maximum number of physical resource blocks $nPRB_{MCS}$ transmittable by the terminal device, the following:
    calculating an initial maximum number of physical resource blocks to be allocated to the terminal device "Round1UEShare" as $$Round1UEShare = \max\left(1, \text{floor}\left(\frac{w_{UE,i}}{\sum_{j=i}^{N} w_{UE,j}} * RemainingPRBs\right)\right),$$

wherein "RemainingPRBs" is the number of currently remaining physical resource blocks to be allocated, $w_{UE,i}$ is a weighing factor for the ith terminal device of the plurality of terminal devices arranged in said order of ascending "$nPRB_{MCS}$" and N is the number of the plurality of terminal devices; and
allocating, to the terminal device, an initial number of physical resource blocks being equal to AllocatedPRBs1=min(Round1UEShare1,$nPRB_{MCS}$), wherein "nPRB$_{MCS}$" is the maximum number of physical resource blocks transmittable by the terminal device without the power spectral density falling below the associated pre-defined limit for the power spectral density.

13. The apparatus according to claim 9, wherein the at least one memory and the computer program code are configured, with the at least one processor, to cause the apparatus to perform the further allocating by:

performing, for at least one of the plurality of terminal devices in an order of descending value of a second pre-defined scheduling metric calculated for a terminal device, the following:

calculating a second maximum number of physical resource blocks "Round2UEShare" to be allocated to the terminal device as $$Round2UEShare = \max\left(1, \text{floor}\left(\frac{w'_{UE,i}}{\sum_{j=i}^{N} w'_{UE,j}} * RemainingPRBs\right)\right),$$

wherein "RemainingPRBs" is the number of currently remaining physical resource blocks to be allocated, $w'_{UE,i}$ is a weighing factor for the ith terminal device of the plurality of terminal devices arranged in said order of descending value of the second pre-defined scheduling metric and N is the number of the plurality of terminal devices;

allocating, to the terminal device, a number of additional physical resource blocks being equal to AllocatedPRBs2=min(Round2UEShare2,nPRB$_{TBS}$—nPRB$_{MCS}$), wherein "nPRB$_{TBS}$" is the maximum number of physical resource blocks for sustaining the pre-defined value for the modulation and coding scheme index while maximizing throughput and "nPRB$_{MCS}$" is the maximum number of physical resource blocks transmittable by the terminal device without the power spectral density falling below the associated pre-defined limit for the power spectral density.

14. The apparatus of claim 13, wherein the second pre-defined scheduling metric is a metric dependent on one or more of the following parameters:

signal-to-interference-plus-noise ratio measured at an access node serving a terminal device, a quality of service requirement of a terminal device and a subscription of the terminal device in a network.

15. The apparatus according to claim 1, wherein the apparatus comprise an access node or a part thereof.

16. A method comprising:

allocating one or more of a plurality of available physical resource blocks to a plurality of terminal devices, wherein the allocating is performed so that a power spectral density for the plurality of terminal devices matches or exceeds a pre-defined limit or a plurality of respective pre-defined limits for the power spectral density; and in response to one or more physical resource blocks being still available following the allocating, further allocating at least one of the one or more physical resource blocks still available to at least one of the plurality of terminal devices, wherein the further allocating is performed so that at least a pre-defined value for a modulation and coding scheme index is sustainable for said at least one of the plurality of terminal devices.

17. A computer program embodied on a non-transitory computer-readable medium, said computer program comprising instructions for causing an apparatus to perform at least:

allocating one or more of a plurality of available physical resource blocks to a plurality of terminal devices, wherein the allocating is performed so that a power spectral density for the plurality of terminal devices matches or exceeds a pre-defined limit or a plurality of respective pre-defined limits for the power spectral density; and in response to one or more physical resource blocks being still available following the allocating, further allocating at least one of the one or more physical resource blocks still available to at least one of the plurality of terminal devices, wherein the further allocating is performed so that at least a pre-defined value for a modulation and coding scheme index is sustainable for said at least one of the plurality of terminal devices.

* * * * *